Jan. 2, 1934.  G. H. LAW  1,942,110
PROCESS FOR MAKING REACTION PRODUCTS OF KETENE
Filed Feb. 16, 1932
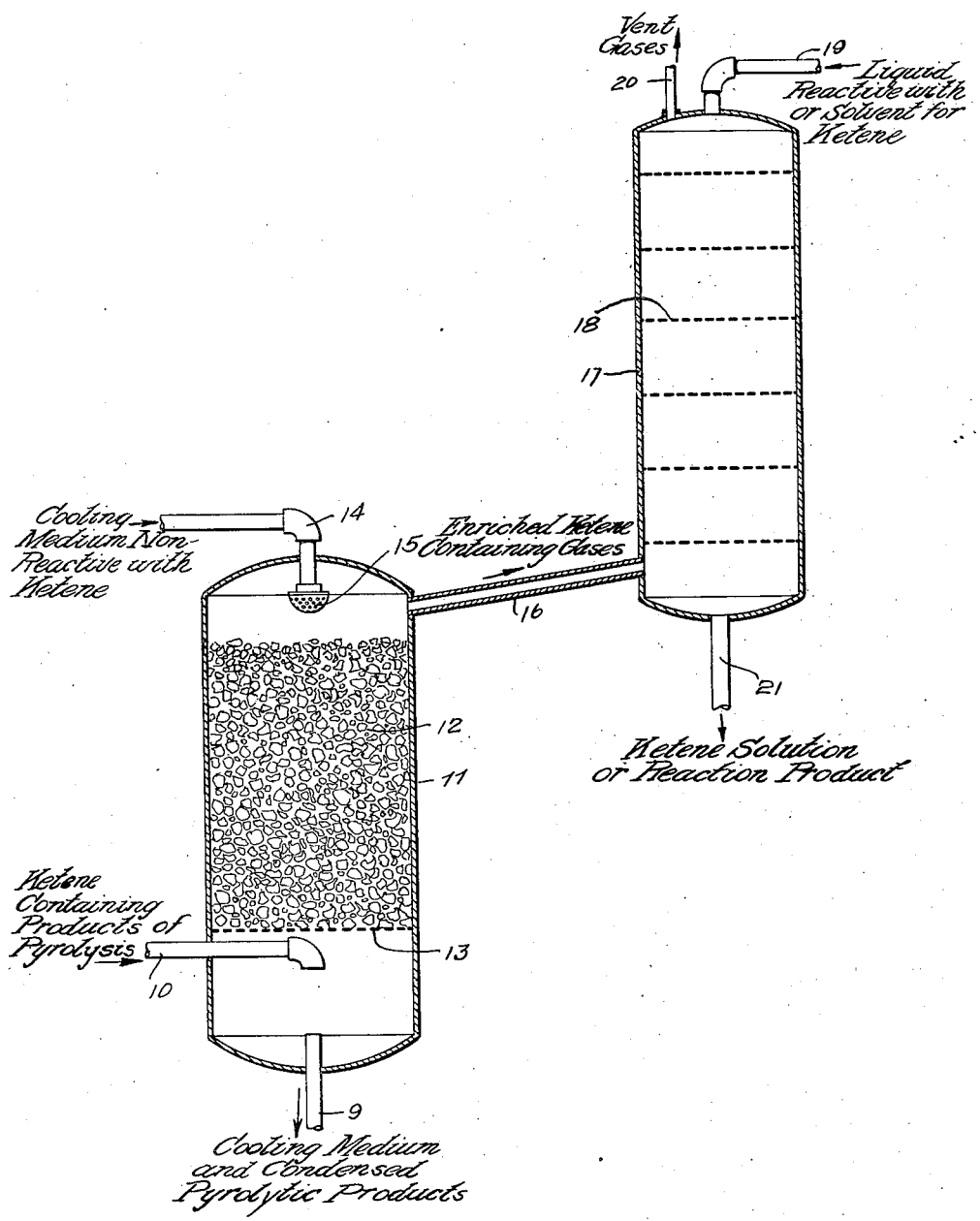
INVENTOR:
George H. Law.
BY Byrnes, Townsend & Potter,
ATTORNEYS Patented Jan. 2, 1934

1,942,110

UNITED STATES PATENT OFFICE 1,942,110

PROCESS FOR MAKING REACTION PRODUCTS OF KETENE

George H. Law, South Charleston, W. Va., assignor to Carbide and Carbon Chemicals Corporation, a corporation of New York Application February 16, 1932. Serial No. 593,354

14 Claims. (Cl. 260—134)

The invention is an improved process for making reaction products of ketene, $CH_2:CO$. The process broadly comprises thermally decomposing organic substances into gaseous products including ketene, rapidly cooling these products in intimate contact with a liquid cooling medium which is non-reactive with ketene whereby the concentration of ketene in the gaseous products is increased, and utilizing the cooled gases, rich in ketene, to form reaction products of ketene.

Ketene can be made by the pyrolysis of certain organic compounds, for example acetone or acetic anhydride, and various uses for ketene as an acetylating agent have been proposed. However, the difficulties involved in obtaining reaction products of ketene have prevented widespread adoption of this substance in organic syntheses. One of the major difficulties encountered in the utilization of ketene is the rapidity with which it polymerizes both in the pure state and in inert solvents under ordinary conditions.

The heretofore proposed methods of utilizing ketene have been largely impractical. In general, nearly all previously proposed methods of utilizing ketene have included partial surface condensation for the purpose of isolating or purifying the ketene prior to its use, but these methods have been unsuccessful. For example, it has been proposed to pyrolize acetone and to pass the vapors so obtained through an up-draft water or brine-cooled surface condenser. The purpose of this latter step was to condense the unconverted acetone, so that ketene or gases rich in ketene were obtained to be utilized. This method of utilizing ketene is unsatisfactory, the condenser and connecting conduits become obstructed with polymerized ketene, and much valuable material is lost. There are various possible explanations for this result. It may be due to the fact that surface condensation produces local supercooling of the ketene resulting in a condensation of this material, thereby allowing the ketene to polymerize, or it may be due to the fact that the time required for the condensing operation is sufficiently long to permit the ketene to react with itself. Whatever the true explanation may be, the prior attempts to utilize ketene which have included such condensing steps have been almost uniformly unsuccessful.

The present invention minimizes these difficulties and provides an efficient and economical method for making reaction products of ketene. The method of practicing my invention will be apparent from the following description, together with the drawing which is a diagrammatic layout of the system used in my new process.

Ketene-containing gases are produced, for example by the pyrolysis of acetone in a copper converter (not shown). These gases are then passed directly and immediately into a scrubber 11 by means of a pipe 10. The scrubber 11 as shown is a packed tower having packing material 12, such as Raschig rings, supported by a perforated plate 13. The use of this form of apparatus is optional; any suitable scrubbing apparatus may be used, such as packed, tray-containing or spray-type scrubbers. In the scrubber 11 the gases leave the pipe 10 below the plate 13 and pass up through the packing 12 in intimate contact with a large volume of a liquid cooling medium which is not reactive with ketene. The non-reactive liquid medium flows down the scrubber 11, entering by a feed pipe 14 and being distributed in the tower by a spray nozzle 15. Suitable liquid media may be aliphatic or aromatic hydrocarbons, such as pentane, hexane or benzene; aliphatic ethers, such as diethyl ether or diisopropyl ether; and aliphatic ketones, such as acetone, ethyl methyl ketone, etc. The supply of the liquid medium and, if necessary, the scrubber 11 itself, may be cooled so that the temperature in the scrubber 11 is at least below the boiling point of the material which was decomposed to produce the ketene. In the case where ketene is produced by pyrolyzing acetone, I prefer to use acetone as the scrubbing medium and to operate the system so that the temperature in the tower is between about 40° and 55° C. The effect produced in the tower is to concentrate the ketene-containing gases and to remove a large proportion of the unchanged acetone from such gases. The scrubbing medium is removed from the scrubber 11 by a pipe 9.

The material which is not condensed in the scrubber 11 is removed therefrom by a pipe 16 to a second scrubber 17. A compressor may optionally be employed in accomplishing this transfer. The scrubber 17 contains trays 18, but other forms of apparatus, such as spray-type or packed towers may be substituted for the form shown. In the scrubber 17 the ketene-containing gases are contacted with a liquid which is supplied through a pipe 19 and which flows down the scrubber 17. This liquid may be either a non-reactive solvent for ketene, in which case a solution of ketene is formed in the scrubber 17, or it may be any substance which is reactive with ketene, in which event the reaction product is formed in the scrubber 17. In either event, the permanent gases are withdrawn from the system by a vent 20, and the liquid containing the dissolved ketene or the reaction product is removed by a pipe 21.

In case a solution of ketene is produced in the scrubber 17 the liquid solvent must be cooled so as to dissolve nearly all of the ketene, and the solution so obtained must be maintained at low temperatures in order that the ketene will remain dissolved and will be stabilized sufficiently so that polymerization will be minimized. The solutions so obtained may then be utilized as reagents to acetylate the various materials with which ketene will react.

In case a reaction product of ketene is being prepared in the scrubber 17, any liquid with which ketene will react may be supplied thereto. For example, ketene will react with water to form acetic acid; with acetic acid to form acetic anhydride; with propionic, butyric or other aliphatic acids to form the anhydrides of these acids, acetic acid or acetic anhydride being simultaneously formed; with various alcohols to form the corresponding acetate esters; with aniline to form acetanilide; and with many other substances, especially with those containing an OH radicle as a carboxyl or hydroxyl group.

In a specific example, acetone was pyrolytically decomposed to produce ketene-containing gases. These products at the cracking temperature, i. e. about 600° to 750° C., were passed directly and immediately into contact with a large volume of acetone in a packed scrubbing tower. The elapsed time between the exit of the gases from the cracking furnace and their contact with the liquid acetone was less than 0.03 seconds, and the volume of acetone circulated in the scrubber was about 50 to 75 gallons of acetone to each gallon of liquid acetone which was passed through the cracking furnace. The cracked vapors were thus cooled so rapidly that substantially no polymerization occurred. The temperature in the scrubbing tower was maintained between about 35° and 50° C. so that while practically all of the unchanged acetone in the hot gases was condensed, substantially no ketene was dissolved or condensed. Thus, if the outlet gases from the furnace were of the following composition, which is a typical analysis,

| | Percent |
|---|---|
| Ketene | 8.0 |
| Methane | 9.9 |
| Ethylene and carbon monoxide | 3.3 |
| Acetone | 78.8 | the gases after cooling would contain about 38% of ketene. These gases having a relatively large proportion of ketene may then be either reacted in the second scrubbing tower or dissolved in a solvent, such as acetone or any of the non-reactive liquid media previously listed. In order to dissolve the ketene in a solvent, the liquid should be maintained below 30° C., preferably below 0° C., thorough and intimate contact of the gases and liquid must be secured, and an elevated pressure is advantageous. Absorption in a reaction medium may take place at higher temperatures, preferably 30° to 40° C.

I have found that a solution of ketene in acetone containing about 20% by weight of ketene is a convenient solution which may be used as an acetylating agent. It is necessary to maintain this solution at low temperatures if it is not to be immediately utilized. For practical purposes, brine cooling is sufficient, and temperatures up to 10° to 15° C., may be used. Ketene solutions may be preserved in an unusually stable condition for considerable periods of time if they are cooled with solid carbon dioxide, or otherwise maintained at very low temperatures.

The reaction of ketene in solution at the temperatures above discussed is very slow, and upon heating the solution the ketene is vaporized and lost from solution. Therefore, in order to successfully employ ketene in certain reactions the solution and the material to be reacted upon are placed together under sufficient pressure to keep the ketene in solution when heated to a temperature at which the desired reaction proceeds.

I claim:—

1. Process for making reaction products of ketene which comprises rapidly passing gaseous products of pyrolysis including ketene into intimate contact with a liquid cooling medium which is non-reactive with ketene at a temperature such as to cause the removal of substances less volatile than ketene in said gaseous products by said liquid medium, and thereafter utilizing said gaseous products to form reaction products of ketene.

2. Process for making reaction products of ketene which comprises rapidly passing gaseous products of pyrolysis including ketene into intimate contact with a liquid cooling medium selected from the group consisting of aromatic and aliphatic hydrocarbons, aliphatic ethers, and aliphatic ketones, at a temperature such as to cause the removal of substances less volatile than ketene in said gaseous products by said liquid medium, and thereafter utilizing said gaseous products to form reaction products of ketene.

3. Process for making reaction products of ketene which comprises rapidly passing gaseous products substantially identical with products resulting from the pyrolysis of acetone in contact with copper at temperatures between about 600° and 750° C. into intimate contact with a liquid cooling medium which is non-reactive with ketene at a temperature such as to cause the removal of substances less volatile than ketene in said gaseous products by said liquid medium, and thereafter utilizing said gaseous products to form reaction products of ketene.

4. Process for making reaction products of ketene which comprises rapidly passing gaseous products substantially identical with products resulting from the pyrolysis of acetone in contact with copper at temperatures between about 600° and 750° C. into intimate contact with a liquid cooling medium selected from the group consisting of aromatic and aliphatic hydrocarbons, aliphatic ethers, and aliphatic ketones at a temperature such as to cause the removal of substances less volatile than ketene in said gaseous products by said liquid medium, and thereafter utilizing said gaseous products to form reaction products of ketene.

5. Process for making reaction products of ketene which comprises rapidly passing gaseous products substantially identical with products resulting from the pyrolysis of acetone in contact with copper at temperatures between about 600° and 750° C. into intimate contact with acetone at about 35° to 55° C., and thereafter utilizing said gaseous products to form reaction products of ketene.

6. Process for making reaction products of ketene which comprises rapidly passing gaseous products substantially identical with products resulting from the pyrolysis of acetone in contact with copper at temperatures between about 600° and 750° C. countercurrently into intimate contact with acetone at about 35° to 55° C., the liquid acetone being supplied in the ratio of about 50 to 75 volumes to each volume of liquid pyrolized to produce said products, and thereafter utilizing said gaseous products to form reaction products of ketene.

7. Process for making reaction products of ketene which comprises rapidly passing gaseous products of pyrolysis including ketene into intimate contact with a liquid cooling medium which is non-reactive with ketene at a temperature such as to cause the removal of substances less volatile than ketene in said gaseous products by said liquid medium, immediately thereafter passing said gaseous products into intimate contact with a non-reactive solvent for ketene at a temperature at which ketene will be dissolved by said solvent, and finally contacting the solution so formed with a substance with which ketene will react to form a reaction product thereof.

8. Process for making reaction products of ketene which comprises rapidly passing gaseous products of pyrolysis including ketene into intimate contact with a liquid cooling medium selected from the group consisting of aromatic and aliphatic hydrocarbons, aliphatic ethers, and aliphatic ketones, at a temperature such as to cause the removal of substances less volatile than ketene in said gaseous products by said liquid medium, immediately thereafter passing said gaseous products into intimate contact with a non-reactive solvent for ketene at a temperature at which ketene will be dissolved by said solvent, and finally contacting the solution so formed with a substance with which ketene will react to form a reaction product thereof.

9. Process for making reaction products of ketene which comprises rapidly passing gaseous products substantially identical with products resulting from the pyrolysis of acetone in contact with copper at temperatures between about 600° and 750° C. into intimate contact with a liquid cooling medium selected from the group consisting of aromatic and aliphatic hydrocarbons, aliphatic ethers, and aliphatic ketones, at a temperature such as to cause the removal of substances less volatile than ketene in said gaseous products by said liquid medium, immediately thereafter passing said gaseous products into intimate contact with a non-reactive solvent for ketene selected from the groups consisting of aromatic hydrocarbons, aliphatic hydrocarbons, aliphatic ethers, and aliphatic ketones at a temperature below about 30° C., and finally contacting the solution so formed with a substance with which ketene will react to form a reaction product thereof.

10. Process for making reaction products of ketene which comprises rapidly passing gaseous products substantially identical with products resulting from the pyrolysis of acetone in contact with copper at temperatures between about 600° and 750° C. into intimate contact with acetone at about 35° to 55° C., immediately thereafter passing said gaseous products into intimate contact with acetone at a temperature below 30° C. to form a solution of ketene in acetone, and finally contacting said solution with a substance with which ketene will react to form a reaction product thereof.

11. Process for making reaction products of ketene which comprises rapidly passing gaseous products of pyrolysis including ketene into intimate contact with a liquid cooling medium which is non-reactive with ketene at a temperature such as to cause the removal of substances less volatile than ketene in said gaseous products by said liquid medium, and immediately passing said gaseous products into intimate contact with a substance with which ketene is reactive to form a reaction product thereof.

12. Process for making reaction products of ketene which comprises rapidly passing gaseous products of pyrolysis including ketene into intimate contact with a liquid cooling medium selected from the group consisting of aromatic and aliphatic hydrocarbons, aliphatic ethers, and aliphatic ketones, at a temperature such as to cause the removal of substances less volatile than ketene in said gaseous products by said liquid medium, and immediately passing said gaseous products into intimate contact with a substance with which ketene is reactive to form a reaction product thereof.

13. Process for making reaction products of ketene which comprises rapidly passing gaseous products substantially identical with products resulting from the pyrolysis of acetone in contact with copper at temperatures between about 600° and 750° C. into intimate contact with a liquid cooling medium selected from the group consisting of aromatic and aliphatic hydrocarbons, aliphatic ethers, and aliphatic ketones, at a temperature such as to cause the removal of substances less volatile than ketene in said gaseous products by said liquid medium, and immediately passing said gaseous products into intimate contact with a substance with which ketene is reactive to form a reaction product thereof.

14. Process for making reaction products of ketene which comprises rapidly passing gaseous products substantially identical with products resulting from the pyrolysis of acetone in contact with copper at temperatures between about 600° and 750° C. into intimate contact with acetone at about 35° to 55° C., and immediately passing said gaseous products into intimate contact with a substance with which ketene is reactive to form a reaction product thereof.

GEORGE H. LAW.